United States Patent
Fukumura et al.

[11] Patent Number: 5,697,145
[45] Date of Patent: Dec. 16, 1997

[54] METHOD OF PRODUCING A SHEET ELECTRODE PLATE FOR ELECTROCHEMICAL BATTERY

[75] Inventors: Kenichi Fukumura; Yoshiaki Noda, both of Kanagawa, Japan

[73] Assignee: Fuji Photo Film Co., Ltd., Kanagawa, Japan

[21] Appl. No.: 706,179

[22] Filed: Aug. 30, 1996

Related U.S. Application Data

[63] Continuation of Ser. No. 308,432, Sep. 19, 1994, abandoned.

[30] Foreign Application Priority Data

Sep. 27, 1993 [JP] Japan .................... P.HEI5-239756

[51] Int. Cl.⁶ .................................................... H01M 2/18
[52] U.S. Cl. ...................... 29/623.5; 429/162; 429/233
[58] Field of Search ........................ 29/623.1, 623.4, 29/623.5; 429/127, 162, 194, 233

[56] References Cited

U.S. PATENT DOCUMENTS

| | | | |
|---|---|---|---|
| 4,080,728 | 3/1978 | Buckler | 29/623.4 |
| 4,105,815 | 8/1978 | Buckler | 429/152 |
| 4,137,627 | 2/1979 | Kinsman | 29/623.4 |
| 5,445,906 | 8/1995 | Hobson et al. | 429/162 |

FOREIGN PATENT DOCUMENTS

063574  2/1990  Japan .

Primary Examiner—M. Nuzzolillo
Attorney, Agent, or Firm—Sughrue, Mion, Zinn, Macpeak & Seas, PLLC

[57] ABSTRACT

In producing an electrochemical battery constituted by a positive electrode, a negative electrode and an electrolytic solution, an electrode material coating composition is discharged from an extrusion type liquid injector having a slot, and applied while at least one uncoated portion is being provided on a running conductive support in the running direction, so as to produce a sheet electrode plate.

21 Claims, 5 Drawing Sheets

METHOD OF PRODUCING A SHEET ELECTRODE PLATE FOR ELECTROCHEMICAL BATTERY

This is a continuation of application Ser. No. 08/308,432 filed Sep. 19, 1994, now abandoned.

BACKGROUND OF THE INVENTION

The present invention relates to a method of producing sheet electrode plates of electrochemical batteries.

The degree of electric conductivity of a nonaqueous electrolyte used in a nonaqueous electrolyte battery is lower than that used in an aqueous electrolyte battery. Accordingly, it is necessary to reduce the thickness of an electrode layer formed on a conductive support. In a cylindrical battery, a spiral structure in which a sheet-like electrode is wound has been employed in order to increase the amount of active materials.

FIG. 1 shows an example of the structure of a battery. A positive pole plate 3 having an electrode mixture mainly composed of a positive pole active material, a conductive agent and a bonding agent and applied onto the opposite surfaces of a conductive support to a desired thickness, and a negative pole plate 5 having an electrode mixture mainly composed of a negative pole active material, a conductive agent and a bonding agent and applied onto the opposite surfaces of a conductive support to a desired thickness, are laminated on each other through an insulating thin film separator 4 having a large ionic transmittivity and having a predetermined mechanical strength.

A positive pole lead plate 12 is connected to a conductive support, that is, a core body, on an inner circumferential end portion of the positive pole plate. This positive pole lead plate is further connected to a battery cap 8. A negative pole lead plate 13 is connected to a current collector on an outer circumferential end portion of the negative pole plate. This negative pole lead plate 13 is further connected to a negative pole can bottom 2.

The positive and negative pole plates are produced by cutting a continuously coated sheet-like electrode plate into a predetermined size. If the positive and negative pole lead plates are connected to the positive and negative pole plates by a method such as welding or the like, it is necessary to make the connection portions serve as the support original surface portions having no electrode mixture.

Conventionally, in order to form such an original surface portion of a support, an electrode mixture layer which had been applied and dried on the support was removed. Japanese Patent Post-Examination No. Sho-60-48865 discloses a method in which scars formed by means of a pair of knives and at the same time an electrode composite layer between the scars is cut off by means of a screw slotting cutter. Japanese Patent Unexamined Publication No. Hei-2-98040 discloses a method in which blade-like bodies are urged, in the downward and upward directions, against the electrode mixture layers applied on opposite surfaces so as to remove the electrode mixture layers. In such a case where an original surface portion without an electrode mixture layer was not provided in advance on a support, not only an extra process of removal of an electrode mixture layer was required but also such a removed electrode mixture was made vain.

On the other hand, Japanese Patent Unexamined Publications No. Sho-59-11975, No. Sho-63-59747, and so on, disclose a method in which in producing a sheet-like electrode plate, an uncoated portion is provided on a support in the running direction thereof in order to form an original surface portion on such a conductive support as mentioned above. That is, an electrode material coating composition in which a conductive agent is mixed into an active material and in which a bonding agent and so on are added so that the composition is made to be like paste, is supplied excessively onto the opposite surfaces of a conductive support in advance, and the conductive support is made to pass through a slit formed by a pair of knife blades so that the excessive electrode material is scraped. In such a method of producing an electrode plate, the knife blades having convex portions at their portions facing each other, or tops facing to each other and contacting with the lower surface of the slit, were pressed against the support to thereby scrape the supplied coating composition to form an uncoated portion.

In those methods, however, a slight amount of electrode material which could not be perfectly scraped was left in the original surface portion of the conductive support from which the electrode material was scraped. In the case where a lead plate was welded so as to be connected to this support, the residual electrode material reduced the welding strength of the lead plate so that separation of the lead plate occurred.

If the distance between the convex portions of the knife blades facing each other was reduced or the tops were pressed more strongly in order to make the quantity of the residual electrode material extremely small, because of the use of a thin conductive support, the support often contacted with a scraping device, or the support was broken by foreign matter located between the support and the scraping device.

There is also a method of providing an uncoated portion by roller coating such as a gravure system, a reverse system or the like, in order to form an original surface portion on a support in the running direction thereof. In such a method, a roller for transferring a coating composition to a support is formed to have a circumferentially grooved shape, or a coating composition is scraped by means of a blade having a convex portion in advance, so that a portion having no coating composition is formed on the surface of the transfer roller. When the coating composition is transferred from the transfer roller onto the support, the portion having no coating composition is transferred as an uncoated portion on the support.

However, if the coating composition is not perfectly transferred from the transfer roller to the support, the thickness of coating on the support is scattered, or the coating lacks smoothness. In the case of an electrode material coating composition, which is often made in the form of a slurry or paste, the liquid viscosity is considerably high. In addition, the coating on the support was so thick that the electrode material coating composition could not be perfectly transferred from the transfer roller and a surface superior in smoothness could not be obtained. In addition, the border between the uncoated portion and the coated portion was blurred or zigzagged, and it was difficult to form a coating edge portion which was approximately straight and stable.

Further, as a method of-application of high-viscosity liquid, there are a blade system and a doctor system. Japanese Patent Unexamined Publications No. Sho-63-147575, No. Hei-2-63574, No. Hei-2-258086, and so on, disclose a method in which coating is performed on a support while providing an uncoated portion on the support in the running direction thereof.

The method disclosed in the Japanese Patent Unexamined Publication No. Hei-2-258086 is a method in which a doctor edge having a convex portion is brought into contact with a coating composition layer on a support so as to scrape the coating composition layer to form an uncoated portion. In this method, a coating composition which could not be scraped was left on the uncoated portion in the same manner as in the above-mentioned slit system. On the other hand, in the methods disclosed in the Japanese Patent Unexamined Publications No. Sho-63-147575 and No. Hei-2-63574, indeed an uncoated portion having no electrode material coating composition could be formed, but the time lag in applying the electrode material coating composition and in cutting the coating composition was so large that wrinkles or breaking-off were produced in the conductive support if coating was performed for a long time, or variations were generated in the thickness of an electrode mixture layer due to changes in viscosity of the electrode material coating composition.

SUMMARY OF THE INVENTION

That is, in the case where an electrode mixture layer which has been once applied and dried is separated and removed in order to form an original surface portion of a conductive support for connecting a lead plate thereto, an extra process is required, so that production cannot be performed effectively. In the case where an electrode material coating composition supported on a conductive support in advance was scraped to form an original surface portion on the support, an electrode mixture left in the original surface portion caused separation of a lead plate. Even if the electrode mixture was not left on the uncoated portion, wrinkles or variations of thickness of an electrode mixture layer were produced when production was performed for a long time. It is therefore an object of the present invention to provide a method in which a superior coated surface is obtained on a conductive support while, at the same time, an approximately straight uncoated portion having no residual electrode mixture is provided on the conductive support in the running direction thereof.

The foregoing problems are attained by a method of producing a sheet electrode plate in the production of an electrochemical battery constituted by a positive electrode, a negative electrode and an electrolyte, characterized in that an electrode material coating composition is discharged from an extrusion type liquid injector having a slot so that coating is performed on a running conductive support while providing at least one uncoated portion on the support in the running direction thereof.

In the above-mentioned method, preferably, the pressure of a liquid reservoir portion of the extrusion type liquid injector is not less than 0.2 kg/cm$^2$ and not more than 10 kg/cm$^2$.

An extrusion type liquid injector 21 used in the present invention has a slot 18 formed between two lips 16 and 17 which face each other with a gap therebetween as shown in FIG. 2, and a liquid reservoir 20 located inside the liquid injector 21 so as to communicate with the slot 18. An electrode material coating composition is continuously supplied to this liquid reservoir under volume regulation by a liquid supply equipment provided outside the liquid injector. The coating composition passes through the slot coupled with the liquid reservoir, and is discharged through a slot outlet portion 19 provided with at least one opening portion having an approximately rectangular section. The slot outlet is disposed so as to keep an interval from a running conductive support 14. The coating composition discharged from the slot outlet is applied onto the support. Since the coating composition is not discharged from a non-opening portion of the slot outlet, an uncoated portion where no electrode material coating composition is residual at all is formed on the support in the running direction thereof.

In the case where a plurality of opening portions having an approximately sectional shape are provided in the slot outlet, a slot portion of the liquid injector may be worked in advance so that the opening portions are approximately rectangular as shown in FIG. 3, or a plate-like body may be fixed tightly to the slot portion as shown in FIG. 4. The plate-like body can be composed of metal, ceramic or plastic. An alloy, stainless steel, aluminum, copper, etc. are preferable as materials for the metal plate, and teflon, PET, etc. are preferable as the materials for the plastic plate.

If extrusion type liquid injectors are provided on the opposite sides of a support so as to sandwich the support therebetween, coating can be performed upon the opposite surfaces of the support. In this case, the coating may be carried out simultaneously or sequentially.

It is preferable that the pressure of the liquid reservoir portion of the extrusion type liquid injector is not less than 0.2 kg/cm$^2$ and not more than 10 kg/cm$^2$. A hole was formed in the extrusion type liquid injector so as to reach its liquid reservoir portion, a diaphragm pressure gauge was installed in the hole, and the pressure in the liquid reservoir was measured under normal pressure while the electrode material coating composition was being supplied under volume regulation by a liquid supply equipment.

When the electrode material coating composition was applied by the above-mentioned extrusion type liquid injector, there was a case where the border between a coated portion and an uncoated portion was not obviously approximately straight, but zigzagged or blurred. In-this case, in the process of welding a lead plate, the lead plate was separated due to a lack of enough strength of the weld. Therefore, a deep study was made to obtain an approximately straight border between a coated portion and an uncoated portion. As a result of the study, it was found that the stability of a border portion changed depending on the pressure in the liquid reservoir portion of the extrusion type liquid injector. The electrode material coating composition used in the present invention had high viscosity in a region from 0.5 Pas to 500 Pas (measured at 25° C. by a B type viscometer made by Tokimek Inc.).

It was found that if the pressure of the liquid reservoir portion was lower than 0.2 kg/cm$^2$, the border between a coated portion and an uncoated portion was blurred or zigzagged, or the electrode material coating composition was not discharged from the slot outlet portion uniformly, or in an extreme case the electrode material coating composition could not be pushed out.

However, if the pressure of the liquid reservoir portion was too large, the electrode material coating composition leaked out between the body and side plate of the extrusion type liquid injector, or the coating composition was blurred between a plate and lips tightly fixed inside the slot for forming an approximately rectangular opening portion. To prevent such leakage of the coating composition, it is necessary to restrain the pressure of the liquid reservoir portion to be not more than 10 kg/cm$^2$.

Although the carriage speed of the conductive support in the present invention is not limited specifically, it is preferable to select it to be in a range of from 0.1 to 100 m/min, particularly in a range of from 0.1 to 50 m/min.

By use of the present invention, at least one uncoated portion is provided on a conductive support in its running direction. The uncoated portion will become a connection portion when a lead plate is to be connected to an electrode plate. The uncoated portion is located on one end portion of a strip-like electrode plate cut out of an electrode sheet to a desired size. In the case of cutting out the electrode plate, therefore, separation may be made at the border between uncoated and coated portions, or may be made by halving the uncoated portion in the running direction of the support. Although examples of providing an uncoated portion are illustrated in FIG. 5, needless to say, the invention is not limited to this.

FIGS. 5(A) and 5(B) show examples of providing one uncoated portion. Cutting out the electrode plates is performed along the broken lines in the drawings. In the example of FIG. 5(B), in which the uncoated portion is halved, it is possible to produce twice as many electrode plates as an electrode sheet coated in FIG. 5(A). FIGS. 5(C) and 5(D) show examples of providing two uncoated portions. In the example of FIG. 5(C), uncoated portions on the opposite sides are used as lead plate connection portions. FIG. 5(E) shows an example of providing three uncoated portions. The width of each uncoated portion depends on the method of cutting out the electrode plates from an electrode sheet or the size of a connection portion. It is preferable that the width is selected to be in a range of from 0.3 cm to 5 cm.

The electrode material coating composition applied by the present invention may include electrode active materials, conductive agents, bonding agents, solvents, and so on. As the electrode active material, any compound can be used if the compound can be inserted and/or released $H^+$, $Li^+$, $Na^+$ or $K^+$. Particularly, transitional metal oxides, transitional metal chalcogenides and carbonaceous materials may be used, and lithium containing transitional metal oxides, transitional metal oxides and carbonaceous materials are preferable. (It is preferable that the transitional metal mainly contains Mn, Co, Ni, V or Fe.) Specifically, the examples may include $LiCoO_2$, $LiNiO_2$, $LiCo_{0.5}Ni_{0.5}O_2$, $LiMn_2O_4$, $LiCoVO_4$, $LiNiVO_4$, $LiCo_{0.9}Sn_{0.1}O_2$, $LiCo_{0.9}Ti_{0.1}O_2$, $LiCo_{0.9}Al_{0.1}O_2$, $LiCo_{0.9}In_{0.1}O_2$, $LiCo_{0.9}Y_{0.1}O_2$, $LiCo_{0.9}Ce_{0.1}O_2$, $Fe_3O_4$, $V_6O_{13}$, $V_2O_5$, and so on. As the carbonaceous materials, it is preferable that the plane distance of 002 plane is in a range of from 3.35 to 3.80 A (angstrom), the density is in a range of from 1.1 to 1.7 $g/cm^3$. The examples may include graphite, petroleum coke, cresol resin burned carbon, furan resin burned carbon, polyacrylonitrile fiber burned carbon, vapor phase grown carbon, meso-phase pitch burned carbon, and so on.

Any conductive agent may be used so long as it is an electrically conductive material which brings no chemical change in a completed battery. Usually, one kind of or any mixture of conductive materials such as natural graphite (imbricate graphite, scale-like graphite, etc.), artificial graphite, carbon black, acetylene black, Ketjen black, carbon fiber, metal powder, metal fiber, polyphenylene derivative, and so on may be utilized. The combination of graphite and acetylene black is preferable.

As the bonding agent, at least one kind of or any mixture of polysaccharides, thermoplastic resins, and polymers having rubber elasticity may be used. The preferable examples may include starch, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene terpolymer (EPDM), sulfonated EPDM, styrene-butadiene rubber, polybutadiene, fluoro rubber, and polyethylene oxide. The bonding agent may be soluble in the solvent, or may be educed as dispersion, suspension, or the like. As the solvent, water or at least one kind of or any mixture of organic solvents may be used.

The solvent is not limited specifically in the present invention. It is however preferable to use N-methyl pyrolidone, xylene, toluene, acetone, methyl ethyl ketone, methyl isobutyl ketone, cyclohexanone, ethanol, methanol, methyl acetate, ethyl acetate, butyl acetate, methylene chloride, ethylene chloride, or the like.

Although the conductive support in the present invention is not limited specifically, conductive films of metal foil (aluminum, copper, nickel, stainless steel, etc.), inorganic oxides, organic high polymer materials, carbon, and so on may be used. The form of the support may be a continuous body, a perforated body, or a net. Particularly, the continuous body is preferable. Preferably, the thickness of the conductive support is in a range of from 1 to 200 µm.

The conductive support coated with electrode material is carried to a drying room so that the solvent is removed. The drying method is not limited specifically, and it is possible to use various systems such as hot air drying, infrared drying, contact drum drying, etc., or a combination of these. As the drying temperature in the case of hot air drying, 40° to 250° C. is preferable, and particularly 50° to 200° C. is preferable. The electrode material is applied onto the head and tail surfaces of the support sequentially or simultaneously, and pressed after being dried. Preferably, the diameter of a press roller is not less than 300 mm and not more than 3,000 mm, and the pressing pressure is not less than 2,000 $kg/cm^2$ and not more than 10,000 $kg/cm^2$. In the case where the solvent cannot be removed satisfactorily by the above-mentioned drying, another drying process can be provided after the pressing. As the system of drying, it is possible to use vacuum drying, infrared drying, high temperature drying, or combination of these.

DETAILED DESCRIPTION OF THE PREFERRED EMBODIMENTS

Although the present invention will be described in detail by way of examples, the present invention is not limited to those examples, and numerous modifications may be made without departing from the spirit and scope of the present invention.

EXAMPLE 1

Figure 1:
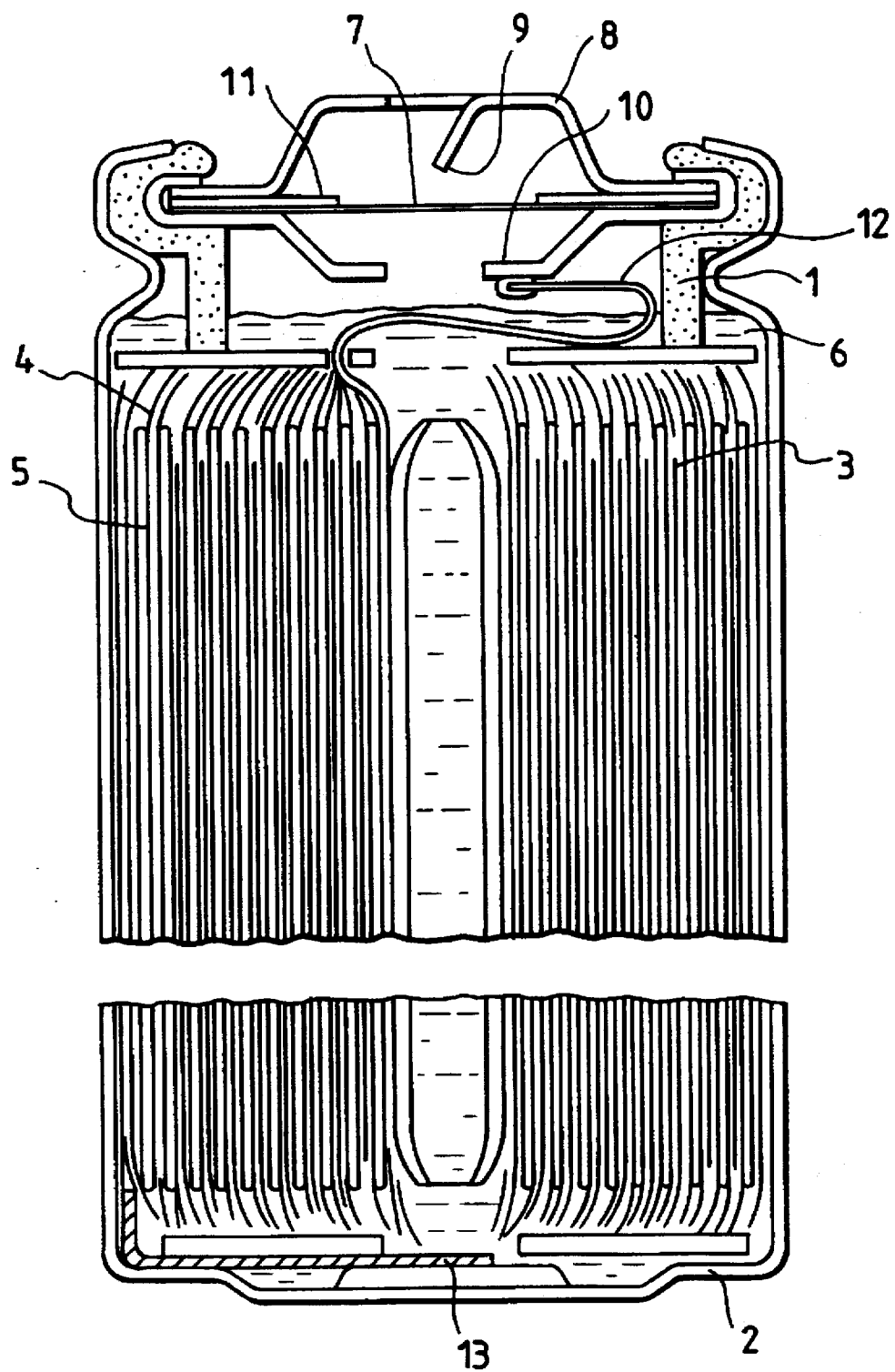
FIG. 1 is a structural sectional view of a cylindrical battery.
Figure 2:
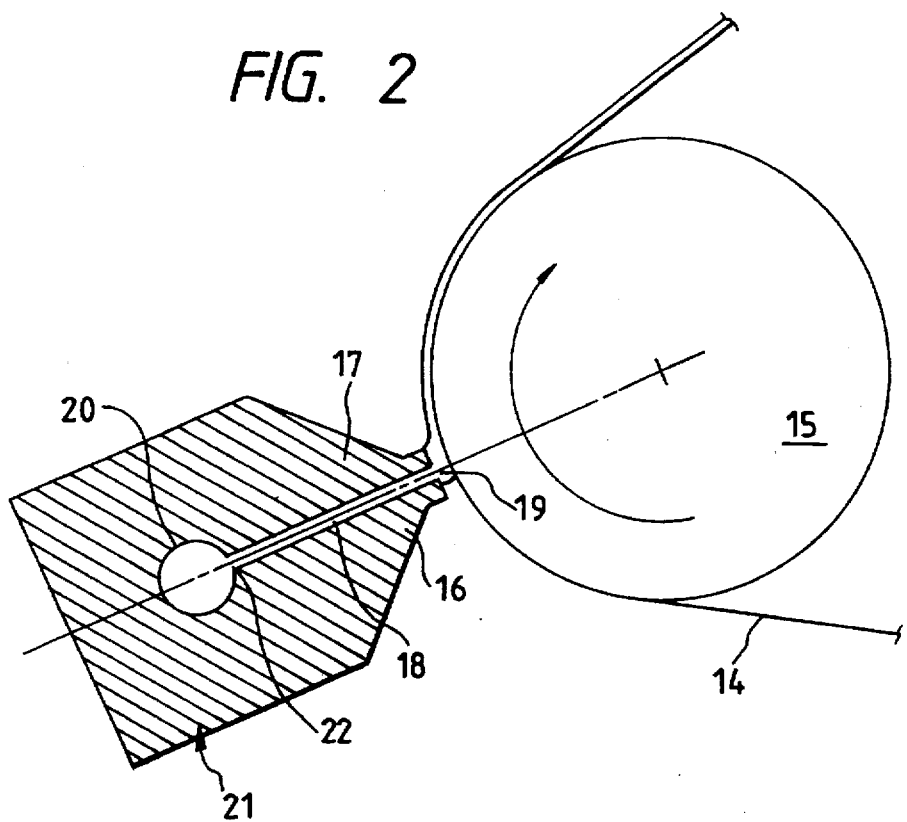
FIG. 2 shows a main portion of a coating apparatus used in the present invention.
Figure 3:
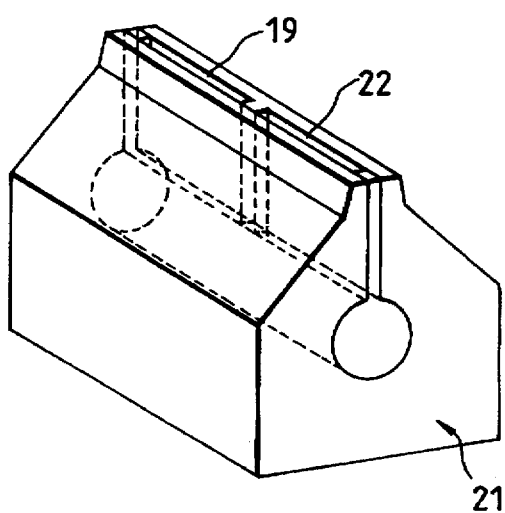
FIG. 3 shows an embodiment of a liquid injector used in the present invention.
Figure 6:
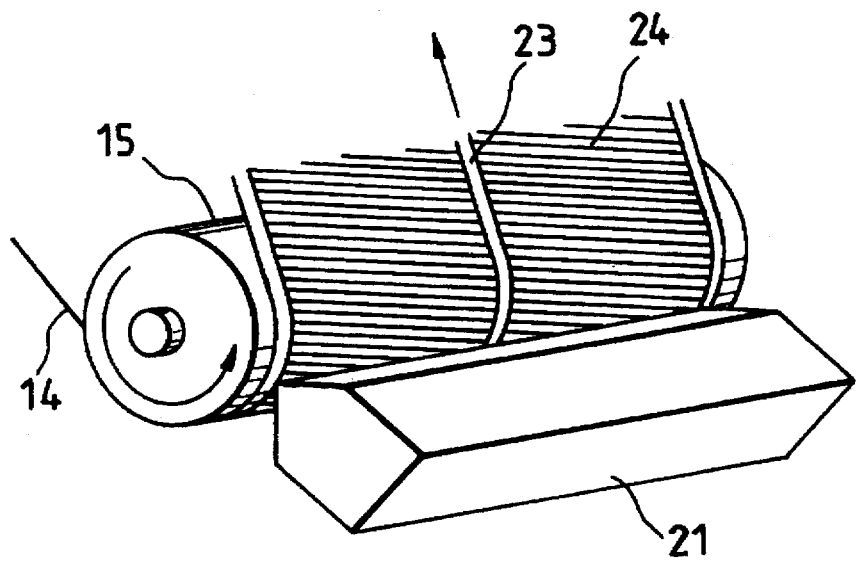
FIG. 6 shows a coating apparatus according to the present invention.

Slurry was prepared through a process in which $LiCoO_2$ as positive pole active material and acetylene black as conductive agent were mixed in the proportion of 88 and 9 parts by weight respectively, polyvinylidene fluoride as a bonding agent was added thereto by 3 parts by weight, N-methyl pyrolidone as solvent a was further add thereto, and then the whole was kneaded to thereby obtain the slurry. The slurry was applied onto the opposite surfaces of aluminum foil having a thickness of 20 82 m successively one surface after the other by the method of the present invention by use of such a coating apparatus as shown in FIG. 6. A liquid injector in which a slot portion was formed as shown in FIG. 3 was used, and two opening portions having an approximately rectangular section of 270 mm width were provided at an interval of 20 mm. Coating was performed for 1 hour under the conditions that the distance between the slot outlet and the support was 0.5 mm, the slot clearance was 0.7 mm, the width of the inlet-side and outlet-side lip surfaces was 3 mm, and the carriage speed of the support was 1 m/min. The solid content of the electrode material coating compound was 60% by weight, and the pressure of the liquid reservoir portion was 0.9 kg/cm$^2$. The applied substance was formed compressively by means of a roller press after hot air drying, so as to produce a positive pole sheet having a thickness of 370 μm.

EXAMPLE 2

Figure 4:
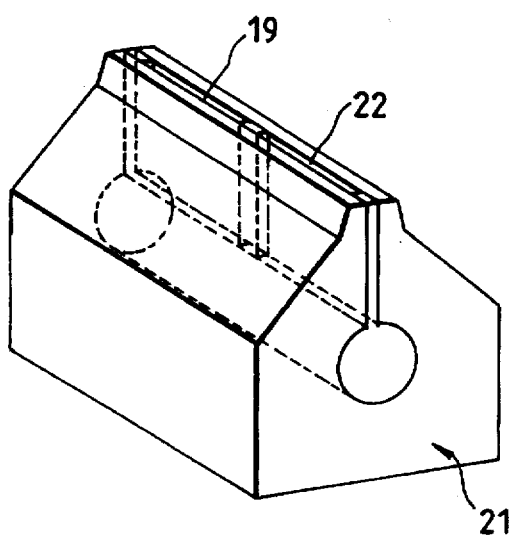
FIG. 4 shows another embodiment of a liquid injector used in the present invention.
Figure 5A:
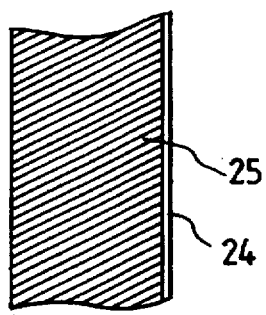
FIGS. 5(A)–5(E) show examples of an electrode sheet according to the present invention.
Figure 5B:
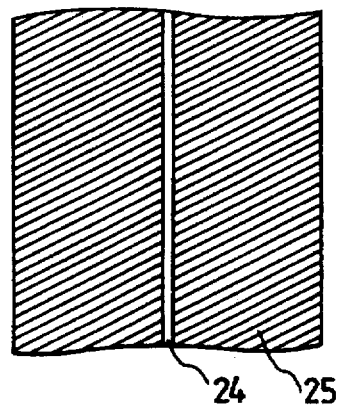
Figure 5C:
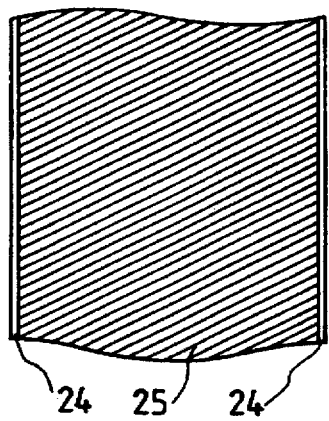
Figure 5D:
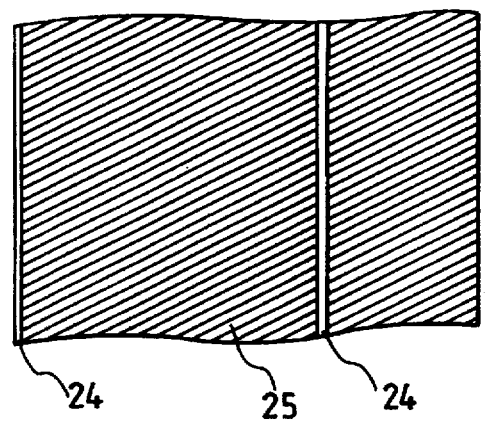
Figure 5E:
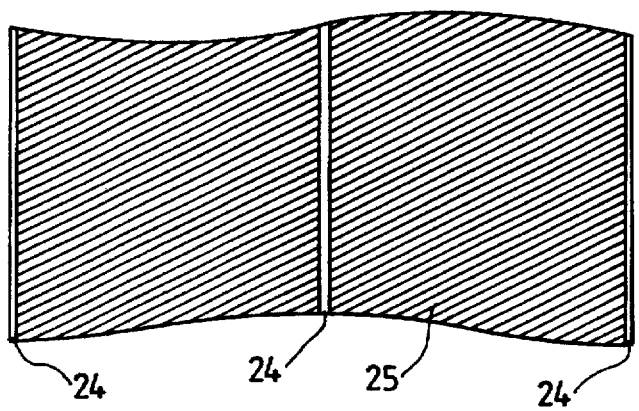

Slurry was prepared through a process in which LiCoVO$_4$ (obtained by burning lithium carbonate, cobalt oxide and vanadium pentoxide in the air at 1,000° C. for 24 hours) as negative pole active material and acetylene black and graphite as conductive agent were mixed in the proportion of 86, 3 and 6 parts by weight, respectively, styrene-butadiene rubber and carboxymethyl cellulose as bonding agent were added thereto by 4 and 1 parts by weight respectively, water was added thereto and then the whole was kneaded. The slurry was applied onto the opposite surfaces of copper foil having thickness of 20 μm successively one surface after the other in the method of the present invention by use of such a coating apparatus as shown in FIG. 6. A teflon plate was tightly fixed to the slot portion of the liquid injector as shown in FIG. 4, and two opening portions having an approximately rectangular section of 270 mm width were provided at an interval of 20 mm. Coating was performed for 1 hour under the conditions that the distance between the slot outlet and the support was 0.5 mm, the slot clearance was 0.8 mm, the width of the inlet-side and outlet-side lip surfaces was 3 mm, and the carriage speed of the support was 1 m/min. The solid content of the slurry electrode material coating compound was 50 weight %, and the pressure of the liquid reservoir portion was 0.2 kg/cm$^2$. The applied substance was formed compressively by means of a roller press after hot air drying, so as to produce a negative pole sheet having thickness of 220 μm.

EXAMPLE 3

The same electrode material coating compound as that of Example 2 was applied onto the opposite surfaces of a support successively one surface after the other as shown in FIG. 6. A teflon plate was tightly fixed as shown in FIG. 4, and two opening portions having an approximately rectangular section of 270 mm width were provided at an interval of 20 mm. Coating was performed for 1 hour under the conditions that the distance between the slot outlet and the support was 0.5 mm, the slot clearance was 0.6 mm, the width of inlet-side and outlet-side lip surfaces was 3 mm, and the carriage speed of the copper foil of 20 μm was 10 m/min. The pressure of the liquid reservoir portion was 4 kg/cm$^2$. The applied substance was formed compressively by means of a roller press after hot air drying, so as to produce a negative pole sheet having a thickness of 220 μm.

EXAMPLE 4

The same electrode material coating compound as that of Example 2 was applied onto the opposite surfaces of a support successively one surface after the other as shown in FIG. 6. A teflon plate was tightly fixed as shown in FIG. 4, and two opening portions having an approximately rectangular section of 270 mm width were provided at an interval of 20 mm. Coating was performed for 1 hour under the conditions that the distance between the slot outlet and the support was 0.5 mm, the slot clearance was 0.4 mm, the width of the inlet-side and outlet-side lip surfaces was 3 mm, and the carriage speed of the copper foil of 20 μm was 10 m/min. The pressure of the liquid reservoir portion was 10 kg/cm$^2$. The applied substance was formed compressively by means of a roller press after hot air drying, so as to produce a negative pole sheet having a thickness of 220 μm.

Comparative 1

Figure 7A:
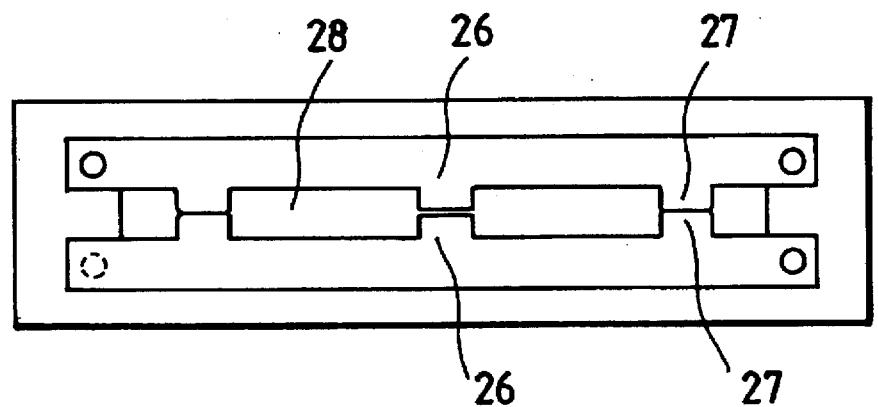
FIGS. 7(A) and 7(B) show a pull-up coating apparatus with a pair of knife blades.
Figure 7B:
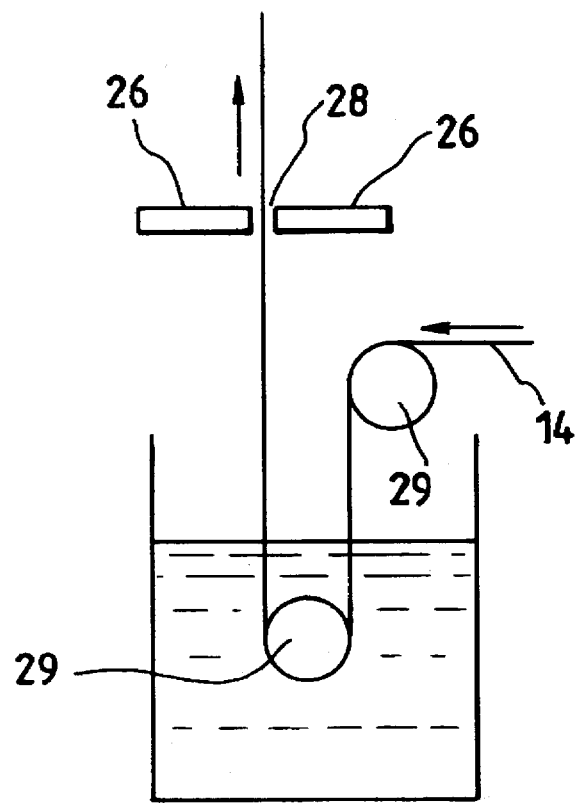

By use of the same electrode material coating composition as that of Example 1, coating was performed while an uncoated portion was being provided in the support running direction by using a pull-up system with a slit formed by a pair of knife blades as shown in FIG. 7. Aluminum foil of 20 μm was used as a conductive support, and coating was performed for 1 hour at a carriage speed of 1 m/min. The applied substance was formed compressively by a means of roller press after hot air drying, so as to produce a positive pole sheet having thickness of 370 μm.

Comparative 2

Figure 8:
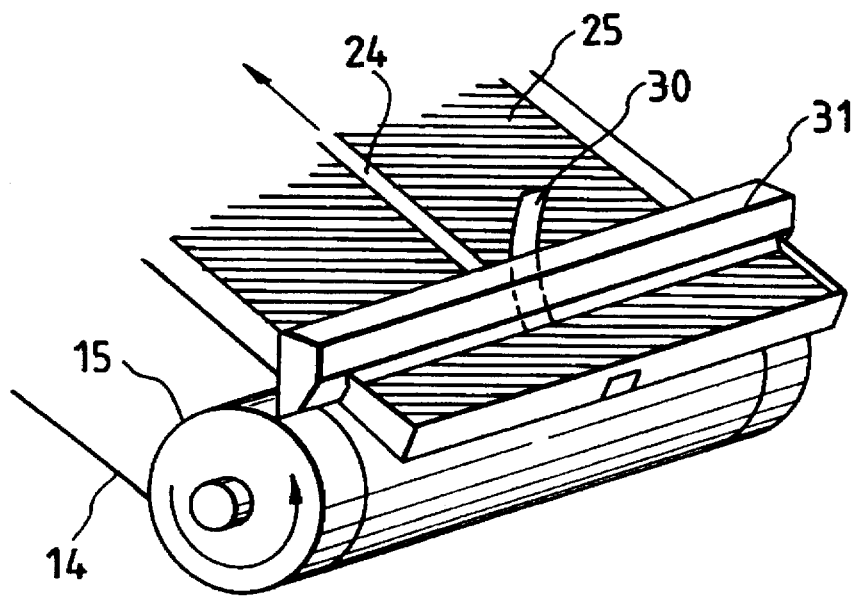
FIG. 8 shows a coating apparatus using a doctor system.

By use of the same electrode material coating composition as that of Example 1, coating was performed while an uncoated portion was being provided in the support running direction by using a doctor system as shown in FIG. 8. By use of PET film having width of 20 mm as a spacer and Aluminum foil of 20 μm as a conductive support, coating was performed for 1 hour at a carriage speed of 1 m/min. The applied substance was formed compressively by means of a roller press after hot air drying, so as to produce a positive pole sheet having thickness of 370 μm.

Comparative 3

The same electrode material coating compound as that of Example 2 was applied onto the opposite surfaces of a support successively one surface after the other as shown in FIG. 6. A teflon plate was tightly fixed as shown in FIG. 4, and two opening portions having an approximately rectangular section of 270 mm width were provided at an interval of 20 mm. Coating was performed for 1 hour under the conditions that the distance between the slot outlet and the support was 0.5 mm, the slot clearance was 1.0 mm, the width of the inlet-side and outlet-side lip surfaces was 3 mm, and the carriage speed of the copper foil of 20 μm was 1 m/min. The pressure of the liquid reservoir portion was 0.15 kg/cm$^2$. The applied substance was formed compressively by means of a roller press after hot air drying, so as to produce a negative pole sheet having a thickness of 220 μm.

Comparative 4

The same electrode material coating compound as that of Example 2 was applied onto the opposite surfaces of a support successively one side after the other as shown in FIG. 6. A teflon plate was tightly fixed as shown in FIG. 4, and two opening portions having an approximately rectangular section of 270 mm width were provided at an interval of 20 mm. Coating was performed for 1 hour under the conditions that the distance between the slot outlet and the support was 0.5 mm, the slot clearance was 0.35 mm, the width of the inlet-side and outlet-side lip surfaces was 3 mm, and the carriage speed of the copper foil of 20 μm was 10 m/min. The pressure of the liquid reservoir portion was 13 kg/cm².

TABLE 1

|  | state of generation of uncoated portion | long coating for one hour |
|---|---|---|
| Example 1 | o good | o no problem |
| Example 2 | o good | o no problem |
| Example 3 | o good | o no problem |
| Example 4 | o good | o no problem |
| Comparative 1 | X liquid adhered in stripes | X broken in 30 minutes |
| Comparative 2 | o good | X wrinkles generated after 30 minutes |
| Comparative 3 | X blurred | o no problem |
| Comparative 4 | coating is impossible because of leakage of coating composition from the side plate |  |

In Examples 1 to 4, it was possible to obtain a good uncoated portion where there was not any electrode material coating composition. In Comparative 1, short stripes of the coating composition adhered to the uncoated portion here and there. In Comparative 2, the uncoated portion was good as far as having no coating composition. In Comparative 3, the border between the coated portion and the uncoated portion was blurred, that is, the end portion of the coated portion was like a thin film and expanded to the uncoated portion over the width of several mm, so that the uncoated portion was not good. In Comparative 4, the coating composition leaked out of the side plate of the extrusion type liquid injector, so that coating could not be performed.

Further, when continuous coating was performed for 1 hour, in Comparative 1, wrinkles were was produced in 15 minutes after the coating started, and breaking of the support occurred in 30 minutes. In Comparative 2, the support was not broken, but several times wrinkles were produced before coating ended after 30 minutes had passed since the coating started. In Examples 1 to 4 and Comparative 3, continuous coating could be performed for 1 hour without any problems.

As is apparent from the above description, if the present invention is used, it is possible to stably produce a good uncoated portion having no electrode material coating composition. That is, if the present invention is used, the working of separating an electrode mixture layer of a lead welding portion is not necessary, so that coating can be performed stably for a long time. Accordingly, it is possible to reduce the number of working processes, and hence reduce the staff, or improve the efficiency of the process of coating.

What is claimed is:

1. A method of producing a sheet electrode plate for an electrochemical battery constituted by a positive electrode, a negative electrode, and an electrolyte, said method comprising the steps of:
   discharging an electrode material coating composition from an extrusion liquid injector having a slot; and
   performing coating on a continuous, running conductive support while providing at least one continuous, uncoated portion on said support in the running direction thereof, said support defining a center and sides wherein said at least one continuous uncoated portion is located at the center.

2. The production method of claim 1, wherein the pressure of a liquid reservoir portion of said extrusion liquid injector is not less than 0.2 kg/cm² and not more than 10 kg/cm².

3. The production method of claim 1, wherein said electrochemical battery is a nonaqueous electrolyte battery.

4. The production method of claim 2, wherein said electrochemical battery is a nonaqueous electrolyte battery.

5. A method of producing a sheet electrode plate for an electrochemical battery constituted by a positive electrode, a negative electrode, and an electrolyte, said method comprising the steps of:
   discharging an electrode material coating composition from an extrusion liquid injector having a slot; and
   performing coating on a continuous, running conductive support while providing two continuous, uncoated portions on said support in the running direction thereof, said support defining a center and sides, wherein said two uncoated portions are respectively at the center and at at least one of the sides of said support.

6. The production method of claim 5, wherein the pressure of a liquid reservoir portion of said extrusion liquid injector is not less than 0.2 kg/cm² and not more than 10 kg/cm².

7. The production method of claim 5, wherein said electrochemical battery is a nonaqueous electrolyte battery.

8. The production method of claim 6, wherein said electrochemical battery is a nonaqueous electrolyte battery.

9. A method of producing a sheet electrode plate for an electrochemical battery constituted by a positive electrode, a negative electrode, and an electrolyte, said method comprising the steps of:
   discharging an electrode material coating composition from an extrusion liquid injector having a slot; and
   performing coating on a continuous, running conductive support while providing three continuous, uncoated portions on said support in the running direction thereof, said support defining a center and opposite sides wherein said three uncoated portions are respectively at the center and at the opposite sides of said support.

10. The production method of claim 9, wherein the pressure of a liquid reservoir portion of said extrusion liquid injector is not less than 0.2 kg/cm² and not more than 10 kg/cm².

11. The production method of claim 9, wherein said electrochemical battery is a nonaqueous electrolyte battery.

12. The production method of claim 10, wherein said electrochemical battery is a nonaqueous electrolyte battery.

13. A nonaqueous electrolyte battery comprising a positive electrode, a negative electrode, and an electrolyte, said positive and negative electrodes each being formed of a sheet electrode plate, said sheet electrode plate being produced by:
   discharging an electrode material coating composition from an extrusion liquid injector having a slot; and
   performing coating on a continuous, running conductive support while providing at least one continuous, uncoated portion on said support in the running direction thereof.

14. The battery of claim 13, wherein the pressure of a liquid reservoir portion of said extrusion liquid injector is not less than 0.2 kg/cm² and not more than 10 kg/cm².

15. A nonaqueous electrolyte battery comprising a positive electrode, a negative electrode, and an electrolyte, said positive and negative electrodes each being formed of a sheet electrode plate, said sheet electrode plate being produced by:

discharging an electrode material coating composition from an extrusion liquid injector having a slot; and performing coating on a continuous, running conductive support while providing two continuous, uncoated portions on said support in the running direction thereof.

16. The battery of claim 15, wherein the pressure of a liquid reservoir portion of said extrusion liquid injector is not less than 0.2 kg/cm² and not more than 10 kg/cm².

17. A nonaqueous electrolyte battery comprising a positive electrode, a negative electrode, and an electrolyte, said positive and negative electrodes each being formed of a sheet electrode plate, said sheet electrode plate being produced by:

discharging an electrode material coating composition from an extrusion liquid injector having a slot; and performing coating on a continuous, running conductive support while providing three continuous, uncoated portions on said support in the running direction thereof.

18. The battery of claim 17, wherein the pressure of a liquid reservoir portion of said extrusion liquid injector is not less than 0.2 kg/cm² and not more than 10 kg/cm².

19. The method of producing a sheet electrode plate of claim 1, wherein said step of discharging the electrode material coating composition further comprises supplying a fixed-quantity of the electrode material coating composition to said slot utilizing a liquid supplying device located outside of the extrusion liquid injector.

20. The method of producing a sheet electrode plate of claim 5, wherein said step of discharging the electrode material coating composition further comprises supplying a fixed-quantity of the electrode material coating composition to said slot utilizing a liquid supplying device located outside of the extrusion liquid injector.

21. The method of producing a sheet electrode plate of claim 9, wherein said step of discharging the electrode material coating composition further comprises supplying a fixed-quantity of the electrode material coating composition to said slot utilizing a liquid supplying device located outside of the extrusion liquid injector.

* * * * *